2,910,070
PEA SHELLER

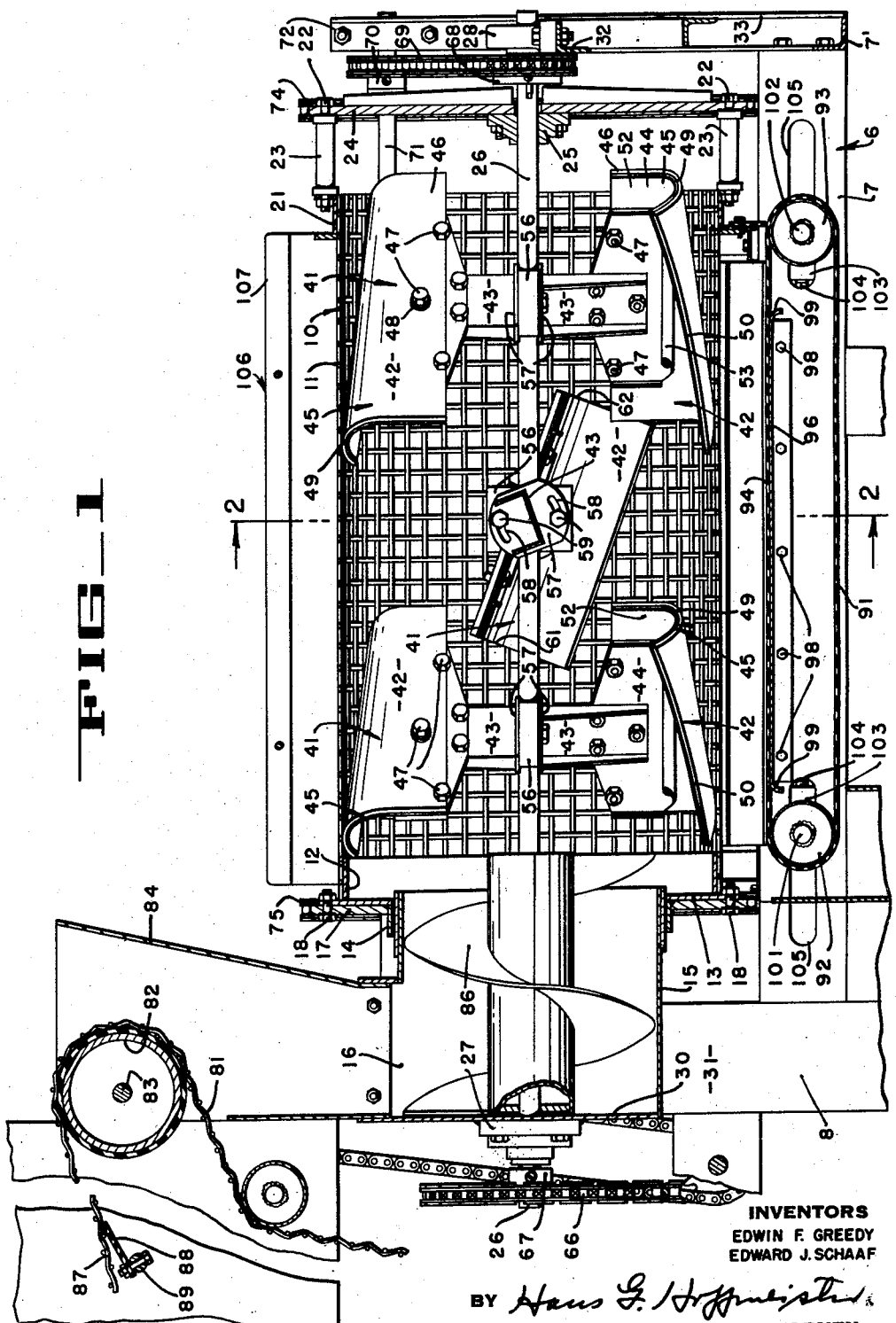

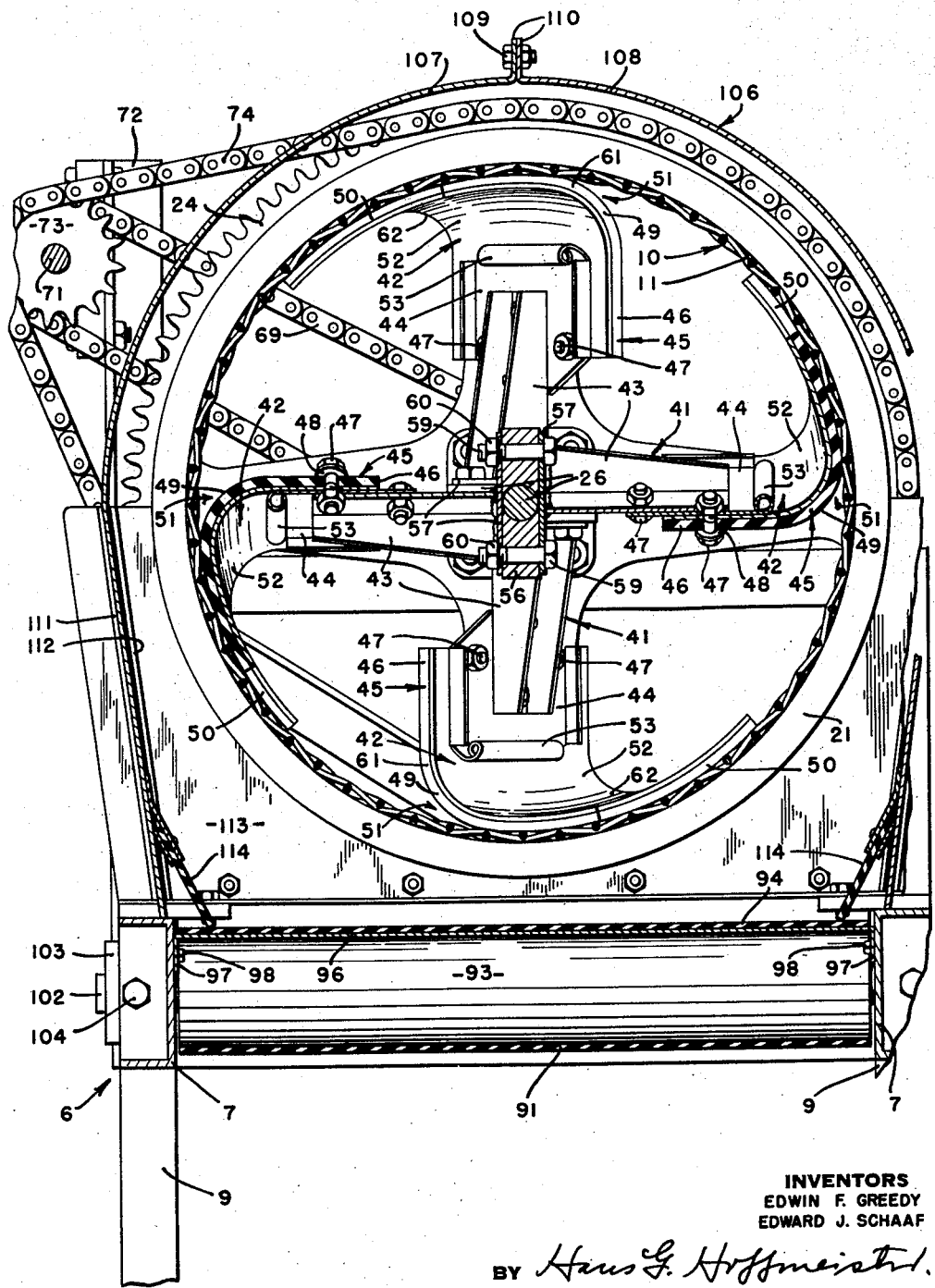

Edwin F. Greedy and Edward J. Schaaf, Hoopeston, Ill., assignors to Food Machinery and Chemical Corporation, San Jose, Calif., a corporation of Delaware Application May 26, 1954, Serial No. 432,433

6 Claims. (Cl. 130—30)

This invention relates to agricultural threshing and more particularly to the removal of the seeds from the pods of carpellate plants.

An object of the invention is to provide an improved method of shelling pod-enclosed vegetables such as legumes.

Another object is to provide a simple and efficient machine for performing the method of the invention.

Another object is to provide a threshing machine which is particularly adapted for shelling green peas.

Apparatus now in common use for opening green pea pods and removing the peas therefrom operates on the principle of beating, i.e., subjecting the pods to the impact of flails which exert considerable force on the pods usually to the extent that a high proportion of the peas are bruised or cut, thus causing considerable economic loss. Another object of the present invention, therefore, is to provide a method of and a machine for shelling green peas which operate on the principle of exerting a gentle, yielding, squeezing pressure on the unopened pea filled pods while the same are rolled over and over. The squeezing pressure is thus progressively applied to all lateral surfaces of each pod causing the same to be flexed until they break open, usually along their relatively weak suture lines. In this manner the peas are released from the pods, which permits their being subsequently separated from the pod remnants by a simple screening process.

Another object is to provide a green pea shelling apparatus as described in which a lower member for exerting rolling and squeezing forces on the pod is in the nature of a foraminous screen through the interstices of which the peas gravitate immediately upon being released from the pods, thus minimizing the liability of bruising or otherwise injuring the peas by the continued operation of the squeezing and rolling members of the apparatus.

These and other objects and advantages of the invention will become apparent from the following description and the accompanying drawings, in which:

Figure 1 is a longitudinal sectional view of the green pea shelling machine of the invention.

Figure 2 is a transverse section taken along line 2—2 of Fig. 1.

As illustrated in the drawings, the pea shelling machine of the invention is mounted on a frame 6 comprising two horizontal longitudinally extending channel members 7 rigidly secured in spaced parallel relation by a plurality of transversely extending frame members such as that indicated at 7' and supported on two pairs of legs 8 and 9. The legs 8 are rigidly affixed to the ends of the horizontal members 7 at the inlet end of the machine, while the legs 9 are secured to the horizontal channels 7 at locations spaced inward from the opposite ends thereof to provide cantilever support for the discharge end of the machine, below which suitable means (not shown) may be disposed for receiving and disposing of the empty pods from which peas have been removed by the machine.

A cylindrical screening drum 10 is rotatably mounted in a horizontal position on the frame 6. The drum 10 may be composed of any suitable foraminous material the interstices of which are large enough to permit passage therethrough of the shelled peas, but small enough to retain at least a major portion of the pods remaining after peas have been removed therefrom. Preferably the foraminous material used in the drum 10 is woven wire screening 11 of approximately 1" center-to-center mesh inasmuch as such material has been found to possess ample strength and rigidity to maintain its shape even under severe working conditions. Furthermore, the irregular surface of such mesh develops sufficient frictional resistance to sliding motion of pea pods thereon to induce the pods to roll rather than to slide while being processed within a drum constructed of such material.

One end of the screening cylinder 11 is fitted over and welded to a circular flange 12 which is welded to a radially extending flange 13 having a cylindrical hub 14 of smaller diameter than the flange 12 and rotatably mounted on a cylindrical extension 15 of a hopper boot 16 mounted in fixed position on the frame 6. A sprocket wheel 17 is rigidly secured to the radial flange 13 by a plurality of bolts 18.

The opposite end of the screening drum 10 is fitted within and welded to a circular flange 21 rigidly secured by bolts 22 and spacing tubes 23 to a sprocket gear 24 corresponding in pitch diameter to the sprocket gear 17. The sprocket gear 24 is provided at its center with a hub 25 journaled on a shaft 26 extending axially of the drum 10.

The shaft 26 is rotatably supported adjacent its ends in bearings 27 and 28, the former being mounted on plate 30 rigidly interconnecting upward extensions 31 of the legs 8, and the latter being secured to a transverse brace 32 interconnecting channel members 33 rigid with and extending upward from the overhanging ends of the horizontal frame members 7 at the discharge end of the machine.

The shaft 26 carries a plurality of pairs 41 of opposed pod rolling and squeezing paddles 42. Each of the paddles 42 comprises a shank 43 extending radially from the shaft 26 and having a mounting plate 44 rigid with and extending laterally to both sides of the shank 43 at its outer end. A strip 45 of resiliently flexible material such as common rubber belting, is affixed to the mounting plate 44 by a plurality of bolts 47 extending through the inner end portion 46 of the strip 45 and through the mounting plate 44, washers 48 being interposed between the heads of the bolts 47 and the strip 46. The intermediate portion 49 of the strip 45 is flexed through an angle of approximately 90°, disposing the outer end portion 50 of the strip 45 in a trailing position, conforming to the curvature of, and in wiping engagement with, the inner circumference of the drum 10, as best shown in Fig. 2. The curvature of the intermediate portion 49 is relatively gentle, i.e., is about a radius of substantial length, so that the intermediate portion 49 cooperates with the inner surface of the drum 10 in defining a tapering or V-shaped mouth 51 within which pods to be opened become lodged, and, due to the tapering nature of the mouth 51, wedge inward the trailing outer end portion 50 of the strip 45 until the same is sufficiently spaced from the drum 10 to permit the pod to enter the space thus formed and assume a position between the drum 10 and the outer end portion 50 of the strip.

The strip 45 should be sufficiently flexible to be capable of having its outer end portion 50 flexed inward away from the drum 10 by a pod forcing its way more and more deeply into the tapering mouth 51 as a consequence of motion of the strip 45 with respect to the screen 11 and in the direction causing the trailing portion 50 of the strip to sweep up over the pod, without crushing the peas contained within the pod. The strip 45 is of sufficient resilience, or stiffness, to resist being flexed by the pea pod, with that degree of firmness which will cause the trailing portion 50 of the strip to exert substantial pressure on the pod, for a purpose explained later herein.

Under some circumstances, and depending upon the inherent stiffness of the belting material of which the strip 45 is composed, it is desirable to reinforce the strip 45 with a backing strip 52 of resiliently flexible material such as spring bronze, coextensive in area with the strip 45 of belting and having its inner end interposed between the backing plate 44 and the inner end 46 of the belting 45. Inasmuch as the strips 45 and 52 are continually subjected to varying degrees of flexing during operation of the machine it is preferred that the outer edge of the backing plate 44 be rolled to provide a curved support 53 for the strips 45 and 52 in the event that the strips are flexed to a degree approaching the maximum, in which event the support 53 will prevent the strips 45 and 52 from being permanently deformed by being bent around the outer edge of the backing plate 44 so sharply as to exceed the elastic limit of the material of the backing strip 52.

The shank 43 of each paddle 42 is affixed to the shaft 26 for rotational adjustment about the longitudinal axis of the shank 43 which, as mentioned hereinabove, extends radially from the shaft 26. For this purpose a plurality of blocks 56 are welded to the shaft 26 at spaced intervals along the shaft. Each block 56 has parallel opposite faces each of which provides a foundation for one of the paddles 42. The inner end of the shank 43 of each paddle 42 is provided with a flat mounting plate 57 having two concentric arcuate slots 58 arranged therein on opposite sides of the shank 43. A pair of mounting bolts 59 extend through each block 56 and through the arcuate slots 58 of the mounting plates 57 of two oppositely extending paddles 42, thus mounting a pair 41 of the paddles 42 on each of the blocks 56. By loosening the nuts 60 of the bolts 59 associated with any one of the blocks 56, both associated paddles 42 can be rotated independently about an axis extending radially of the drum. In this manner each of the paddles 42 is adapted to be adjusted to a selected position of angularity with respect to the shaft 26, causing the paddle to assume a position wherein the lateral edge 61 thereof closer to the inlet end of the drum 10, leads, as compared with the paddle's lateral edge 62 farther from the inlet end of the drum. Because of this oblique position of each paddle 42 (best illustrated by the position of the paddle 42 at the central portion of Fig. 1) the portion of each paddle which first encounters pods within the drum engages the same with a glancing impact tending to push the pods toward the outlet end of the drum, and thus causes the material being operated on to advance longitudinally through the drum. In this manner the material is moved progressively from the zone of one pair 41 of paddles into the zone of the next pair, and so on, until the last pair of paddles causes the material to pass through the outlet end of the drum, whence it drops through the space maintained between the drum and the gear 24 by the spacer tubes 23.

The shaft 26 and the paddles 42 carried thereby are continuously rotated at suitable speed by a motor (not shown) operably connected to the shaft 26 by means of a sprocket chain 66 (Fig. 1) trained around a sprocket gear 67 affixed to a portion of the shaft 26 extending beyond the bearing 27. Means are likewise provided for rotating the screen drum 10 in the same direction but at a lesser speed so as to attain differential rotation of the paddles 42 and the drum 10. A sprocket gear 68 is affixed to the shaft 26 adjacent the discharge end of the machine, and a sprocket chain 69 is trained around the sprocket gear 68 and likewise around a driven sprocket gear 70 rigid with a counter shaft 71 journaled in frame extensions 72 (Fig. 2). The counter shaft 71 carries two sprocket gears 73 which are operatively connected by sprocket chains 74 (Fig. 1) and 75 to the sprocket gears 17 and 24, respectively. Inasmuch as the sprocket gears 68 and 70 are of approximately the same pitch diameter the counter shaft 71 rotates at approximately the same speed as the paddle shaft 26; but the two drum sprocket gears 17 and 24 are of much larger pitch diameter than the sprocket gears 73, and consequently the drum 10 will rotate at a much lesser speed than the paddles 42. A speed ratio between drum 10 and paddles 42 of approximately 1 to 10 has been found to be satisfactory.

A continuous supply of peas in the pod is fed into the drum 10 by means of a conveyor belt 81 (Fig. 1) the delivery end of which is trained around a pulley 82 rotatably mounted on a shaft 83 extending transversely of a hopper 84 through which the peas to be shelled gravitate to the boot 16 of which the tubular extension 15 hereinabove mentioned is a continuation. A feed screw 86 extends axially through the boot 16 and extension 15 and is rigidly mounted on the paddle shaft 26 so as to rotate therewith. The feed screw 86 is fitted closely to the rounded bottom of the boot 16 and the bore of the tubular extension 15; and the pitch of the screw 86 is such that material received in the boot 16 from the hopper 84 is advanced by the rotating feed screw 86 through the extension 15, whence the material drops into the receiving end of the screening drum 10.

The conveyor belt 81 whereby the peas to be shelled are delivered to the shelling apparatus preferably is made of a relatively coarse mesh wire fabric having interstices of sufficient size to permit any loose peas contained in material conveyed thereby, to drop through the belt 81 to be retrieved by a suitable receiver (not shown). This prevents peas already removed from the pods from being delivered to the shelling apparatus. Inasmuch as under some circumstances of operation there may be deposited on the conveyor belt 81 a relatively matted mass of pods, and sometimes even a few pieces of the stems and leaves of the vines, within which some loose peas may be entrapped, it is desirable to provide means for agitating or shaking the upper run 87 of the belt 81 so as to effect release of the loose peas and permit the same to drop through the interstices of the belt. Toward this end a beater blade 88 of flexible material such as ordinary belting is carried by a shaft 89 rotatably mounted parallel to and below the upper run 87 of the belt 81 but so closely adjacent thereto that upon rotation of the shaft 89 the blade 88 will strike sharply against the underside of the upper run 87 of the belt. The shaft 89 may be rotated by any suitable means (not shown), preferably coupled to the driving means (not shown) for the feeding conveyor belt 81.

Means are provided for collecting and delivering to a suitable receiver (not shown) the peas removed from their pods by the method of the invention as performed by the combined action of the screen 11 and the paddles 42. A conveyor belt 91 is trained around two spaced, parallel pulleys 92 and 93 so disposed below the receiving and discharge ends, respectively, of the screening drum 10 that the upper run 94 of the conveyor belt 91 extends horizontally below substantially the entire drum 10. To assist in maintaining the upper run 94 of the belt 91 horizontal and thereby minimize the tendency for peas to move otherwise than in conformity with the normal operation of the belt 91, the upper run 94 is supported by a flat sheet or pan 96, the lateral edges of which are bent downward to form flanges 97 through which attaching screws 98 extend so as to mount the pan 96 on the two opposed longitudinal frame members 7. Both ends of the pan 96 are curled downwardly to provide arcuate flanges 99 which prevent the pan 96 from presenting sharp edges to the belt 91. The belt 91 is operated by any suitable means (not shown) for turning either of the pulleys 92 or 93 in that direction which causes the upper run 94 of the belt 91 to move from the delivery end toward the receiving end of the drum 10. Accordingly, peas received on the upper run 94 of the belt will be carried thereby to a position below the inlet end of the drum 10, whence they will fall into a suitable receiver (not shown) located below the pulley 92.

The shafts 101 and 102 of both pulleys 92 and 93 are provided with conventional adjusting means consisting of a pillow block 103 and adjusting screw 104 for moving the shafts 101 and 102 horizontally within slots 105 provided therefor in the horizontal frame members 7, so as to permit adjusting the belt 91 to the desired tension.

A hood 106 encloses the sides and top of the drum 10 to entrap any peas thrown laterally or upward from the revolving drum with sufficient velocity to prevent their falling onto the belt 91. As illustrated, the hood 106 consists of two parts 107 and 108, releasably interengaged along their upper edges by means of bolts 109 extending through flanges 110 formed by deflecting outwardly the upper edge portions of the sections 107 and 108. The lower edges of the hood 106 are retained in drum enclosing position by spaced parallel flanges 111 and 112 (Fig. 2) welded to transverse upstanding plates 113 rigid with the frame 6 of the machine. A flexible deflector 114 associated with the lower edge of each hood section 107, 108 assists in guiding onto the belt 91 any peas intercepted by the hood 106.

In the operation of the green pea shelling machine peas in the pod to be shelled are fed into the receiving end of the screen drum 10 by the cooperative action of the conveyor belt 81, hopper 82, and the feed screw 86 operating within the hopper boot 16 and extension 15 thereof. For most efficient operation it is preferred that peas to be shelled be supplied to the drum 10 in a continuous and even flow, rather than in a succession of batches in each of which a large number of pods are closely bunched together. The maximum rate at which the peas to be shelled should be delivered to the apparatus should be such that the pods will be deposited on the inner circumference of the drum 10 in a thin layer—in fact, best operation will be assured if the pods to be treated are not permitted to pile up on each other within the drum. However, if some moderate degree of such piling should occur pods resting on top of other pods will be advanced to an unoccupied portion of the screen 11 of the drum 10 by the circular, sweeping motion of the flexible strips 45 of the first pair 41 of paddles 42.

Initial engagement of a paddle 42 with any pods lying otherwise than broadside to the approaching paddle, will tend to turn the pods to such a position, thus enabling the advancing paddle to roll the pod about the pod's major axis. Owing to the fact that the intermediate portion 52 of each flexible strip 45 is gently rounded, the leading portion of each strip 45 is spaced from the inner circumference of the drum 10, so that the pods become lodged within the tapering entrance mouths 51 thus defined. The under surface of each pod bears frictionally against the screen 11, which, because of the uneven or irregular nature of its surface, tends to prevent the pod from sliding around the inner circumference of the drum in response to the push exerted thereagainst by a paddle. Similarly, the upper surface of each pod frictionally engages the relatively rough under surface of the flexible strip 45. The result is that each pod is subjected to a rotating couple, since the paddle 42 and screen 11 cooperate to apply oppositely directed forces to the upper and lower surfaces, respectively, of the pod. Consequently, each pod is rolled circumferentially of the drum, at the same time seating progressively deeper within the tapering entrance mouth 51, and thereby wedging the trailing portion 50 of the flexible strip inward away from the drum. This causes the trailing portion 50 to ride over the rolling pod in such a manner that all sides of each pod are exposed to the pressure, or squeezing action, exerted by the resilient strip 45.

The resilience or stiffness of each of the flexible strips 45 is sufficient to impose considerable pressure upon each pod thus being rolled and squeezed by the trailing portion 50 of the strip. Hence, the side walls of each pod are subjected to pressure advancing circumferentially about the pod, and so flexing the side walls of the pod, that the pod soon breaks open, releasing the peas therein contained. Almost immediately, the released peas drop through the interstices of the screen 11, minimizing any tendency for the same to be bruised or otherwise injured by the continued relative motion of the paddles and screen 11.

It has been observed that in most instances breaking of the pod occurs along the suture lines of the pod inasmuch as those portions of the pod constitute its weakest sections. In most instances snapping open occurs when pressure is applied directly to the pod along the suture lines, i.e., when the plane of the two suture lines of the pod is perpendicular to the members applying pressure—a situation closely resembling that existing when peas are shelled by the hand method of sqeezing each pod between thumb and forefinger applied directly to the suture lines of the pod.

The rotation of the screen drum 10 in the same direction as that in which the paddles 42 rotate but at a lesser speed, subjects the pods within the drum 10 to a tumbling action, further preventing the peas from piling up to a depth that would interfere with the efficiency of the paddles in subjecting each individual pod to the described rolling and squeezing action. Moreover, the motion imparted to the contents of the cylindrical drum 10 as a result of its rotation assists the obliquely disposed paddles 42 in advancing the material within the drum toward the discharge end thereof. The fragments of opened pods, as well as any pods remaining unopened, will be advanced longitudinally of the drum 10 each time a paddle 42 encounters the same, so that eventually the mixture of whole pods and pod fragments reaches the zone of operation of the second pair of paddles, where the unopened pods will be again rolled and squeezed. Similarly, any pods remaining unopened after treatment in the second zone will be advanced into the zone of the third pair 41 of paddles 42 where the remaining unopened pods will be opened. Therefore, practically all the material discharged by the obliquely disposed paddles 42 of the last pair 41 consists solely of the remnants of pods from which all of the peas have been released for collection and delivery by the belt 91.

While we have shown and described a preferred apparatus and a preferred method for carrying out our invention, it will be understood that both are capable of modification and variation while still employing the principles of our invention. It is to be understood, therefore, that the scope of the invention should be limited only by the scope and proper interpretation of the claims appended hereto.

Having thus described our invention, what we claim and desire to protect by Letters Patent is:

1. Apparatus for shelling pod enclosed vegetables comprising a rotatable pod supporting foraminous screen and a flexible pod rolling strip mounted for relative movement therein, means connected to said screen and said strip for rotating both said screen and strip in the same direction and at different speeds so as to effect advance of the strip over the surface of the screen, and means for feeding pods to be opened to the interior of of said screen, said strip and screen being arranged to frictionally engage opposite sides of each of said pods to impose a rotating couple thereon, resilient means in engagement with said pod-rolling strip for yieldingly pressing the strip against said supporting screen when pods are not present therebetween for cleaning said screen and for pressing the strip toward the supporting member with force sufficient to break the pods open to release the vegetables therein when the pods are disposed between said strip and said screen, and the interstices of said screen being large enough for passage therethrough of vegetables released from the pods.

2. Apparatus for shelling pod enclosed vegetables comprising a rotatable pod supporting drum, a pod rolling strip mounted within said drum for movement relative thereto, means connected to said drum and said strip for rotating both said drum and said strip in a common direction and at different speeds for causing advance of the strip along the inner surface of the drum, means for feeding pods to be opened to the interior of said drum, said drum and strip being arranged to frictionally engage opposite sides of each of said pods and to cooperate to impose a rotating couple on the same, and means associated with said strip for yieldably pressing the strip toward the supporting drum with force sufficient to break the pods open, said supporting drum having therein openings smaller than the pods and larger than the vegetables released from the pods upon opening of the same for allowing substantially immediate discharge of the vegetables from said supporting drum after release of the vegetables from their pods.

3. Apparatus for shelling pod enclosed vegetables comprising a rotatable drum and a shaft therein mounted for relative rotation, means connected to said drum and shaft for effecting relative rotation of the drum and shaft, means associated with drum for depositing therein pods to be opened, and a plurality of pod rolling and squeezing paddles carried by the shaft, each of the paddles including a shank extending outward from the shaft toward the drum and a flexible strip secured adjacent its inner end to the shank with the inner end portion of the strip disposed in a plane oblique to said shaft for advancing pods from one end of the drum to the opposite end thereof, said strip being flexed intermediately of its inner and outer ends through approximately a right angle to dispose a substantial area of its outer end portion in trailing relation to said inner end portion and in sliding engagement with the inner circumference of the drum when no pods are present, said end portion being in position to frictionally engage and impart prolonged rolling motion to pods disposed between the drum and said trailing outer end portion of the strip, said drum having a plurality of openings therein smaller than the pods and larger than the vegetables released from the pods to allow substantially immediate discharge of the vegetables from said drum after release from the pods.

4. Apparatus for shelling pod-enclosed vegetables comprising a rotatable screening drum having openings in its periphery smaller than the pods and larger than the vegetables released from the pods, means connected to the drum for rotating the same, a shaft mounted for rotation within said drum and extending longitudinally relatively thereto, means connected to said shaft for rotating said shaft at a speed different from the rotary speed of the drum, means for feeding pods to be opened to the interior of said drum, and a plurality of pod-rolling and squeezing paddles rigidly mounted on said shaft, each of said paddles including a flexible strip having its inner portion disposed obliquely relative to said shaft and having its outer portion disposed in contacting engagement against said screening drum, said paddles being arranged to propel the pods axially relative to said drum, and the outer portion of said strip being arranged to be flexed away from said drum to allow pods to enter between the end portion of the strip and the drum to impart a squeezing action and rolling motion to the pods disposed between the drum and said outer portion of the strip for opening the pods and for releasing the vegetables substantially simultaneously from the drum through the openings formed in its periphery.

5. In a pod-opening apparatus, a paddle comprising a shank, a backing plate mounted on said shank and having a rolled edge, a pod-contacting strip of flexible resilient material secured to said plate and having an intermediate portion disposed adjacent the rolled edge of said plate and bent through an angle greater than a right angle, and a resilient metal backing strip interposed between said flexible pod-contacting strip and said backing plate and being coextensive with said strip to maintain a backing of substantially constant resilience for said pod-contacting strip.

6. In combination in a pod-opening apparatus, a shaft, a block rigid with said shaft, an elongated shank mounted on said block to extend radially outward from the shaft and arranged for rotational adjustment about its longitudinal axis, a backing plate secured on said shank, a pod-contacting strip of flexible resilient material secured on said backing plate and having an intermediate portion bent through an angle greater than a right angle, and a resilient metal backing strip interposed between said shank and said flexible pod-contacting strip and being coextensive with said strip to maintain a backing of substantially constant resilience for said pod-contacting strip, said backing plate being disposed in a plane which is oblique relative to the longitudinal axis of the shaft.

References Cited in the file of this patent

UNITED STATES PATENTS

| Number | Name | Date |
| --- | --- | --- |
| 154,924 | Stevens | Sept. 8, 1874 |
| 260,494 | Meyer | July 4, 1882 |
| 288,743 | Swingle | Nov. 20, 1883 |
| 483,899 | Cantwell | Oct. 4, 1892 |
| 486,441 | Empson | Nov. 22, 1892 |
| 709,657 | Aspinwall | Sept. 23, 1902 |
| 719,618 | Scovill | Feb. 3, 1903 |
| 772,691 | Chase | Oct. 18, 1904 |
| 1,118,673 | Northrop | Nov. 24, 1914 |
| 2,004,573 | Galley et al. | June 11, 1935 |
| 2,213,387 | De Back | Sept. 3, 1940 |
| 2,309,630 | De Back | Feb. 2, 1943 |
| 2,529,620 | Marnach et al. | Nov. 14, 1950 |
| 2,795,314 | Becker | June 11, 1957 |